(12) United States Patent
Shaw

(10) Patent No.: US 8,622,545 B2
(45) Date of Patent: Jan. 7, 2014

(54) SPECTACLE LENSES AND METHOD OF MAKING SAME

(75) Inventor: Peter John Shaw, Toronto (CA)

(73) Assignee: Shaw Vision Inc., Toronto (CA)

( * ) Notice: Subject to any disclaimer, the term of this patent is extended or adjusted under 35 U.S.C. 154(b) by 205 days.

(21) Appl. No.: 13/190,525

(22) Filed: Jul. 26, 2011

(65) Prior Publication Data

US 2013/0027659 A1 Jan. 31, 2013

(51) Int. Cl.
*G02C 7/02* (2006.01)
*G02C 7/06* (2006.01)

(52) U.S. Cl.
USPC ............ 351/159.75; 351/159.41; 351/159.42; 351/159.5

(58) Field of Classification Search
USPC .............................. 351/159.74, 159.75, 159.5
See application file for complete search history.

(56) References Cited

U.S. PATENT DOCUMENTS

| | | | |
|---|---|---|---|
| 4,427,272 A | 1/1984 | Gernet | |
| 6,199,983 B1* | 3/2001 | Kato et al. | ............... 351/159.42 |
| 6,945,649 B2 | 9/2005 | Dorsch | |
| 7,241,010 B2* | 7/2007 | Kitani et al. | ............. 351/159.06 |
| 2005/0179861 A1 | 8/2005 | Kitani et al. | |
| 2005/0280775 A1 | 12/2005 | Esser et al. | |
| 2007/0008488 A1 | 1/2007 | Esser et al. | |
| 2010/0296052 A1 | 11/2010 | Esser et al. | |
| 2011/0184830 A1* | 7/2011 | Guilloux et al. | ............. 705/26.5 |
| 2012/0105801 A1* | 5/2012 | Yamakaji | ................ 351/159.76 |

FOREIGN PATENT DOCUMENTS

WO WO/2005091054 9/2005

OTHER PUBLICATIONS

Achiron et al, "Contemporary Management of Aniseikonia", Survey of Ophthalmology, vol. 41, issue 4, pp. 321-330, 1997.
Ogle, "The Correction if Aniseikonia With Ophthalmic Lenses" Journal of the Optical Society of America, vol. 26, pp. 323-337, 1936.
Remole, A., "Anisophoria and Aniseikonia. Part II. The Management of Optical Anisophoria", Optometry and Vision Science, vol. 66, No. 11, pp. 736-746, American Academy of Optometry, 1989.

* cited by examiner

*Primary Examiner* — Jordan Schwartz
(74) *Attorney, Agent, or Firm* — Christopher D. Heer; Bennett Jones LLP

(57) ABSTRACT

A method of making a pair of spectacle lenses which may reduce induced binocular vision distortions where wearer and frame metrics and a lens class are inputted into a computer program, and the computer program determines the left and right lens front curve radius in which there is a substantially linear relationship between the rate of change of lateral vergence and degree of ocular rotation and then adjusts the left and right lens front curve radius and the left and right lens center thickness such that the lateral inter-ocular static magnification target value is between about −3% and about +3% in the lateral plane and the stimulus to near vergence is within the wearer's vergence limits. The computer program then determines a left and right lens index of refraction and a left and right lens material and the generated lens parameters are then used to machine the spectacle lenses.

26 Claims, 9 Drawing Sheets

Saggital view of bridge measurement

Frame at inner eyewire
(bridge)

Measure from limbus to mid
point

Vergence demand in lateral gaze = vl-vr (cm/m)

SPECTACLE LENSES AND METHOD OF MAKING SAME

FIELD OF THE INVENTION

The present invention relates to spectacle lenses, and more particularly, to improved spectacle lenses which may reduce induced binocular vision distortions and a method of making same.

BACKGROUND OF THE INVENTION

Spectacle lenses are typically manufactured to provide optimum clarity of imaging in the monocular condition. Spectacle lenses manufactured this way can cause vision problems such as aniseikonia and anisophoria for individuals with anisometropia, a condition in which the two eyes have unequal refractive power.

Aniseikonia is a term used to describe and quantify the variance of ocular image sizes in a pair of eyes. All spectacle lenses distort the image on the viewer's retina. Lenses that correct near-sightedness cause the viewed object to appear smaller while lenses that correct far-sightedness cause the object to appear larger. Lenses that correct astigmatism cause a fattening or thinning of the object. Eyeglasses also distort the perceived position of an object due to the fact that they remain stationary while the eye moves behind them. If the prescription for each eye is about the same then both eyes receive about the same distortion and there are few adaptation problems. It is when there is a difference in the prescription that discrepancies in size and position occur with the associated dysfunction. Optometrists call ocular image size discrepancies sensory aniseikonia and position discrepancies motor aniseikonia or anisophoria.

The effects of aniseikonia and anisophoria may include ocular discomfort, reduced depth perception, poor reading skills, amblyopia, learning disability, gross motor skill dysfunction, risk of falling, dipolpia or double vision that increases with increased eccentricity of gaze (i.e. it gets worse if you look further off centre), inability to fuse the images, distortion of floor (which may seem to be raised or lowered), suppression of the vision in one eye, headaches and general vision malaise, impaired vision, nausea and dizziness.

Bicentric lens designs (slab-off) provide a discrete prismatic correction to the reading portion of one spectacle lens in a pair to ameliorate the anisophoria in that area. But bicentric lenses are not an option with digitally surfaced lenses because at present there is no capability to manufacture a bicentric lens with digital technology surfacing. Bicentric lenses also fail to attend to the correction of the anisophoria in all positions of gaze or inter-ocular spectacle magnification.

Accordingly, there remains a need for improvements in the art.

BRIEF SUMMARY OF THE INVENTION

The present application is directed generally to improved spectacle lenses and a method of making same which may reduce binocular vision distortions.

According to an aspect of the present invention, there is provided a method of making a pair of spectacle lenses, the pair of spectacle lenses including a left lens and a right lens, each of the left and right lenses including a front curve radius, a centre thickness, an index of refraction and a material, comprising: inputting wearer metrics, frame metrics and a lens class; determining the left lens front curve radius and the right lens front curve radius in which there is a substantially linear relationship between the rate of change of lateral vergence and degree of ocular rotation; adjusting the left lens front curve radius and the right lens front curve radius, the left lens centre thickness and the right lens centre thickness such that the lateral inter-ocular static magnification target value is between about −3% and about +3% in the lateral plane and the stimulus to near vergence is within the wearer's vergence limits; determining a left lens index of refraction and a right lens index of refraction; determining a left lens material and a right lens material; machining the left lens using the left lens front curve radius, left lens centre thickness, left lens index of refraction and left lens material and machining the right lens using the right lens front curve radius, right lens centre thickness, right lens index of refraction and right lens material.

According to a further aspect of the present invention, there is provided a pair of spectacle lenses made according to methods embodying the present invention.

According to a further aspect of the present invention, there is provided a computer program product for designing a pair of spectacle lenses, the pair of spectacle lenses including a left lens and a right lens, each of the left and right lenses including lens parameters including a front curve radius, a centre thickness, an index of refraction and a material, and generating one or more data files containing the lens parameters for use in machining the pair of spectacle lenses, the computer program product comprising: a storage medium configured to store computer readable instructions; the computer readable instructions including instructions for, receiving wearer metrics, frame metrics and a selection of a lens class; determining the left lens front curve radius and the right lens front curve radius in which there is a substantially linear relationship between the rate of change of lateral vergence and degree of ocular rotation; adjusting the left lens front curve radius and the right lens front curve radius, the left lens centre thickness and the right lens centre thickness such that the lateral inter-ocular static magnification target value is between about −3% and about +3% in the lateral plane and the stimulus to near vergence is within the wearer's vergence limits; determining a left lens index of refraction and a right lens index of refraction; determining a left lens material and a right lens material; and generating the one or more data files containing the lens parameters for use in machining the pair of spectacle lenses.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the invention, and how they may be carried into effect, and in which.

Like reference numerals indicate like or corresponding elements in the drawings.

DETAILED DESCRIPTION OF THE EMBODIMENTS

Embodiments of the present invention are generally directed to spectacle lenses which may reduce induced binocular vision distortions such as aniseikonia and anisophoria for individuals with anisometropia.

Embodiments of the invention may be used by optometrists and physicians to assist in the design and manufacture of spectacle lenses according to methods that take into account the design and fit of the spectacle frame. Embodiments of the invention employ a process which specifies front curve radii (base curve) and centre thickness of the respective lenses in a pair of spectacles which may mitigate the effects of anisometropia, and the resultant aniseikonia and anisophoria due to spectacle correction.

Figure 1:
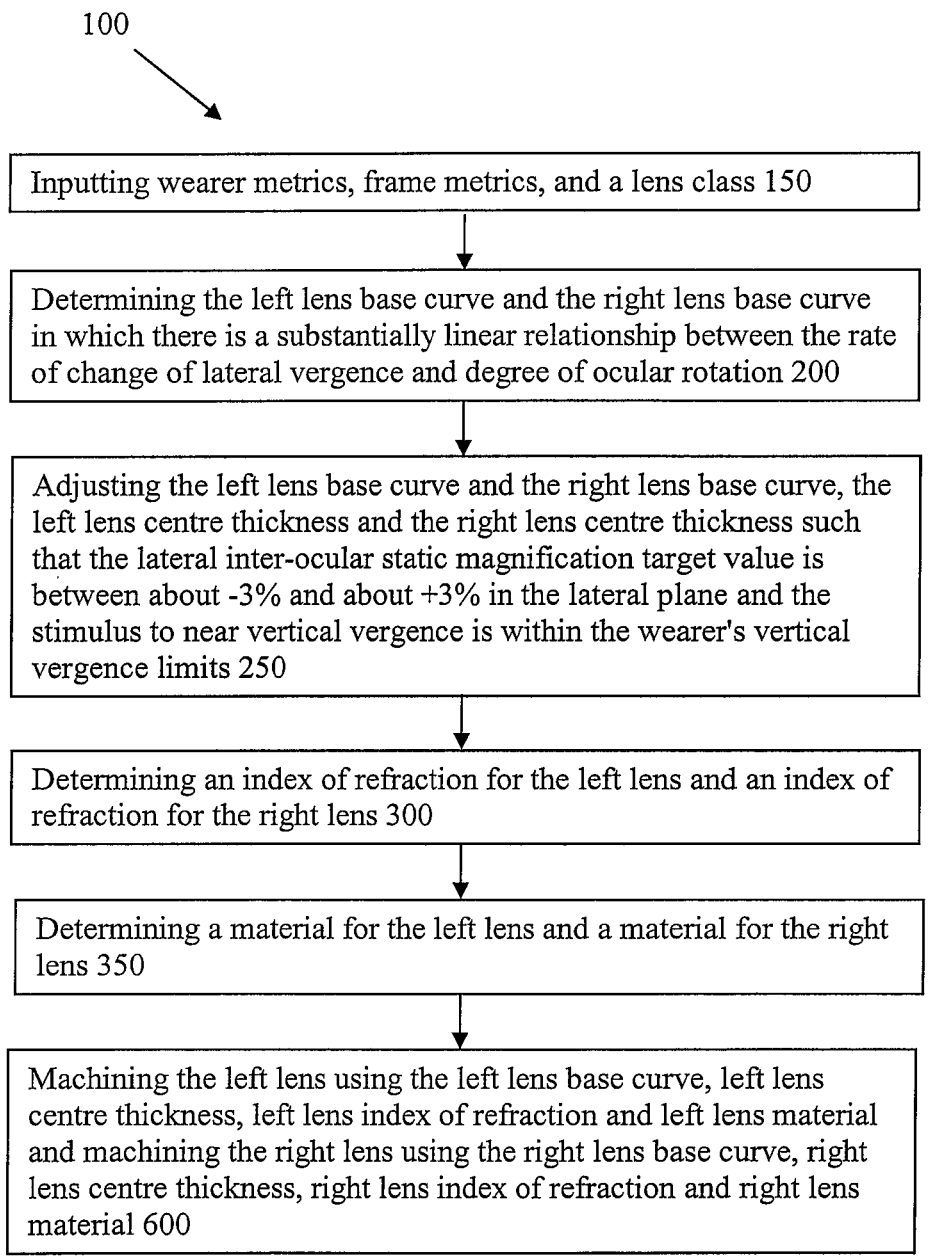
FIG. 1 is a flow chart of an embodiment of a method according to the present invention.

According to an embodiment as shown in FIG. 1, a method of making a pair of spectacle lenses 100 comprises steps of inputting wearer metrics, frame metrics, and a lens class 150, determining the left lens base curve and the right lens base curve in which there is a substantially linear relationship between the rate of change of lateral vergence and degree of ocular rotation 200, adjusting the left lens base curve and the right lens base curve, the left lens centre thickness and the right lens centre thickness such that the lateral inter-ocular static magnification target value is between about −3% and about +3% in the lateral plane and the stimulus to near vertical vergence is within the wearer's vertical vergence limits 250; determining an index of refraction for the left lens and an index of refraction for the right lens 300; determining a material for the left lens and a material for the right lens 350; machining the left lens using the left lens base curve, left lens centre thickness, left lens index of refraction and left lens material and machining the right lens using the right lens base curve, right lens centre thickness, right lens index of refraction and right lens material 600.

According to an embodiment, the wearer metrics that may be inputted in step 150 may comprise wearer refractive metrics, wearer anatomical biometrics and optionally wearer binocular vision metrics. The wearer refractive metrics may be determined by trial frame or refractor and comprise, for each of the right eye and left eye, spherical power component, cylinder power component, cylinder axis, near spherical addition at designated reading distance and vertical and horizontal prescribed prism. The designated reading distance may be defined as the typical distance from the spectacle plane to the reading material. According to an embodiment, this may be 40 cm as is commonly defined in North America. According to another embodiment, the designated reading distance may be 33 cm as is commonly defined in Europe and Asia. In either embodiment, the user may override the default value to suit the needs of the individual wearer. According to an embodiment, power components may be specified in dioptres (1/meter), axis in degrees, reading distance in centimeters, binocular vision metrics (notable positive and negative lateral fusional vergence limits and positive and negative vertical fusion limits) in prism dioptres (cm/m). The wearer anatomical biometrics may include monocular inter-pupillary distance (in mm), visible iris diameter (in mm), axial length (in mm) as may be determined by diagnostic imaging biometry or calculated from the visible iris diameter according to a ratio of the axial length of the eye and the relationship with axial length. The axial length may be used in order to accurately determine the location of the centre of rotation. The location of the centre of rotation may be used to accurately place the centre of rotation in order to establish the vergence demand.

According to an embodiment, the wearer binocular vision metrics which may be inputted in step 150 may comprise the following vergence limits which may be established by measurement with prisms or any other clinically effective means:

Distance, horizontal, positive, motor, fusion limit (prism base-out to blur or break tolerance);

Distance, horizontal, negative, motor, fusion limit (prism base-in to break tolerance);

Distance, vertical, positive motor fusion limit (prism base down right eye to break); and Distance, vertical, negative motor fusion limit (prism base up right eye to break).

As some users may elect not to measure the binocular vision metrics, default values for the wearer's vergence limits representing clinical norms may be provided, for example:

Distance, horizontal, positive, motor, fusion limit (prism base-out to blur or break tolerance)=8 cm/m;

Distance, horizontal, negative, motor, fusion limit (prism base-in to break tolerance)=3 cm/m;

Distance, vertical, positive motor fusion limit (prism base down right eye to break)=2 cm/m; and Distance, vertical, negative motor fusion limit (prism base up right eye to break)=2 cm/m.

According to an embodiment, any or all of the default values may be reconfigured by the user in the computer program.

According to an embodiment, further wearer binocular vision metrics, if available, may be inputted in step 150 to provide a higher level of confidence in the final lens design. For example, wearer binocular vision metrics may comprise vertical dynamic eikonometry, such as the endpoint rotational magnification difference that the eyes exhibit as determined by Robertson eikonometry, or lateral and vertical static eikonometry.

The ophthalmic frame metrics that may be inputted in step 150 may comprise eye size, width, depth, edge diameter, bridge and face form angle (horizontal wrap about a vertical axis), as well as fitting characteristics such as frame vertex (measured from the corneal sclera junction to the bridge eyewire groove centre at the horizontal datum line), in the case of an anterior drill mount, to the posterior frame surface at the anterior lens interface, or in the case of a posterior drill mount, to the anterior frame surface at the posterior lens interface, and pantoscopic angle.

According to an embodiment, these variables discussed above from the metrics inputted in step 150 may be used by the computer program to create an accurate model of the physical size and position of the refractive elements from which to accurately ray trace the optical path in eccentric and central gaze in all positions of gaze. A three-dimensional model of the lenses held in front of the eyes may be constructed by the computer program, where the refractive error corrected enables the construction of two-dimension diagrams in any place and thereafter a three-dimensional construction using geometric equations. Moreover, the eyes may be rotated about a virtual center of rotation which, according to an embodiment, may be calculated at a point about 11 mm from the corneal apex. Ray tracing may be used such that the visual axis may be caused to pass through various points in the lens in order to take up fixation. Snell's law may be used to calculate the deviation of the visual axis at the point of incidence for each eye at points of interest at the spectacle plane. The difference in deviation (vergence) may be calculated in the two primary merideae and this may be compared to the binocular vision metrics obtained for binocular vision vergence limits. The inter-ocular magnification may be compared numerically with the desired inter-ocular magnification target. Accordingly, a three-dimensional model may be built from the metrics inputted in step 150 and the influence upon binocular vision determined by ray tracing.

Figure 4:
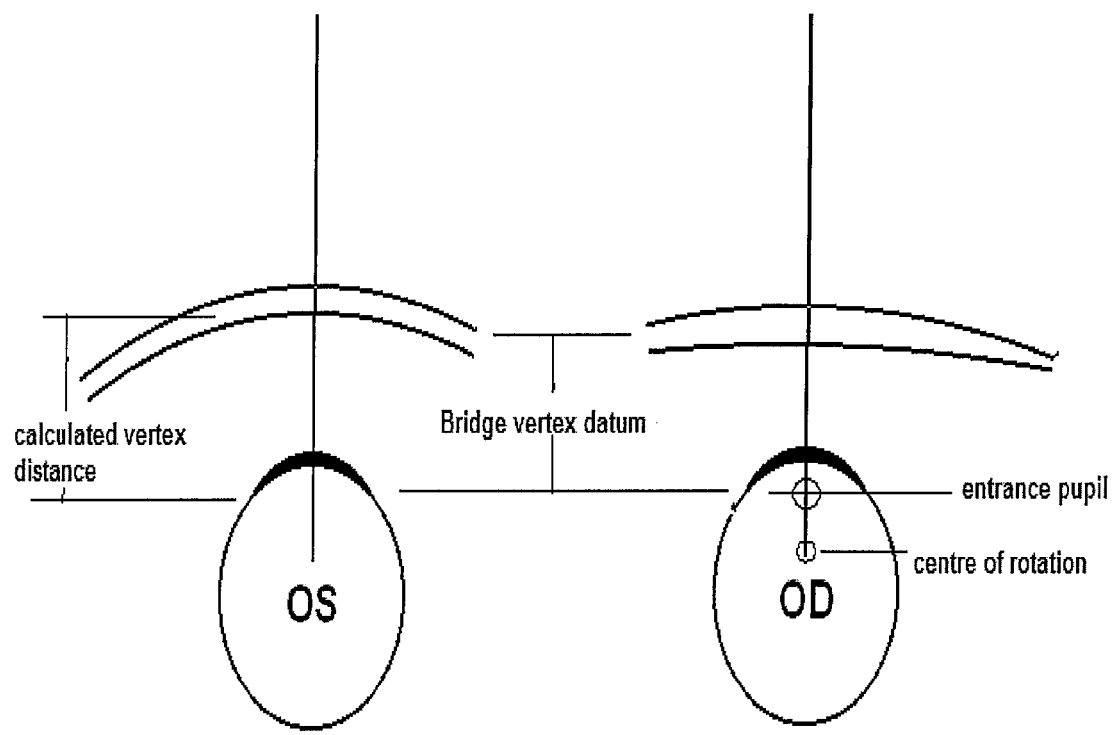
FIG. 4 is a diagram depicting the calculation of vertex distance using the frame bridge as a reference point.

FIG. 4 is a diagram depicting the calculation of vertex distance using the frame bridge as a reference point. FIG. 4 depicts the lateral plane cross section at the vertical midpoint of the eyes in primary gaze of the as worn spectacle lenses. The portion of the frame that connects the two eyes of the frame is located on the nose and this point provides a static reference that is largely unaffected by changes in the lens curvature, face form angle or lens thickness. The measurement may be made from this bridge position to a point of reference on the eye, here, the cornea sclera junction (limbus) since it is readily observed but one may just as easily choose the corneal apex. This measurement may locate the centre of rotation and the ocular entrance pupil location entrance relative to the as worn spectacle correction.

Figure 5:
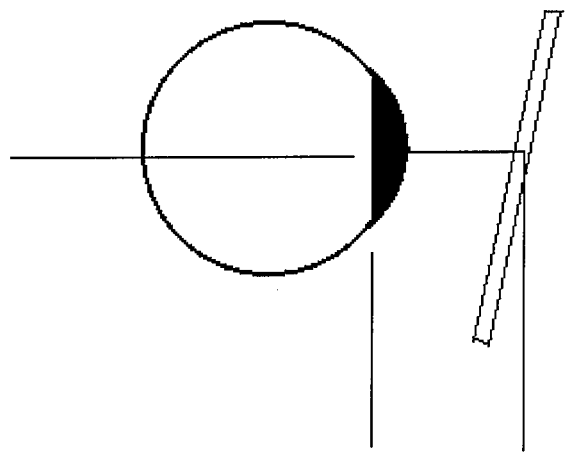
FIG. 5 is a diagram depicting the saggital view of bridge measurement.

FIG. 5 is a diagram depiction the saggital view of bridge measurement. This is depicts the view from the side showing the linear measurement from the limbus to the centre of the eye-wire with the eye in primary gaze position.

According to an embodiment, at step 150, the user may also select the lens class for the lenses. The lens classes may include:
- single vision (monofocal lenses) for distance, intermediate distance or near use;
- bifocal (multifocal lenses with, for example, a moulded segment on the front surface in the shape of a sideways D or circle);
- trifocal (multifocal lenses with a near zone and an intermediate zone with demarcation lines between the zones);
- progressive addition lens, incorporating focal areas that permit clear vision at near, distance and intermediate distances (no line bifocals); and
- occupational/ergonomic design (clear vision at near and intermediate distances).

According to an embodiment, at step 200, base curves and centre thicknesses for the left and right lenses may be determined. According to an embodiment, initial equal base curves for reducing rate of increase of lateral vergence demand may be determined and then non-similar base curves and centre thicknesses may be determined for the management of spectacle-induced aniseikonia and anisophoria due to anisometropia through an iterative process.

Ophthalmic frames with a face form angle (typically greater than 3 degrees) may increase the stimulus to horizontal ocular vergence when the eyes rotate to an eccentric position of horizontal plane gaze. When a pair of lenses with equal or nearly equal positive focal power about the vertical axis is rotated around this vertical axis, base-out prism may be generated. In this situation, a net base-out effect between the two eyes may be created. The amount may increase with eccentricity of gaze, face form angle and refractive power. The effect of the induced base-out prism may be to create a stimulus to require convergence. Moreover, concave lenses may cause a prism base-in effect and may require a compensatory divergence of the eyes from parallel in distance eccentric gaze.

Generally, it is easier for the wearer to converge his or her eyes rather than diverge. These limits may be available from the oculo-visual assessment by the optometrist. The stimulus to vergence may be calculated with constant radius curvatures of front and back surfaces using a ray tracing construction. Alternatively, a more precise calculation may be made with the assistance of the lens manufacturing algorithm but the differences may not be clinically significant. Using ray tracing with the lateral plane model and the centre of rotation of each eye accurately positioned, the computer program may calculate the stimulus according to a lateral rotation of the eyes in degrees.

According to an embodiment of the present invention, base curvatures may be selected which will provide a more linear rate of change of vergence stimulus with eccentric viewing angles, for example, greater than 20 degrees.

According to an embodiment, the computer program may determine the left lens base curve and the right lens base curve in which there is a substantially linear relationship between the rate of change of lateral vergence and degree of ocular rotation 200 by calculating the rate of change of lateral vergence (cm/m/degree/degree) in central gaze and peripheral gaze through an iterative process for each available base curvature in the series. According to an embodiment, the optimum base curve may be selected as that with the largest radius that returns the curve with a slope variance less than a designated value, which is designated to lay between 0.2 cm/m/deg/deg and −0.2 cm/m/deg/deg but may be influenced by limits of production in which case a warning message is generated to alert the user that binocular vision may be compromised. According to an embodiment, standard base curvatures are chosen for the first iteration using the base curve afforded to the higher positive powered lens such that they are equal. By way of example, a representative schedule is provided below for the selection process for equal base curves where the index of refraction is 1.67. Other indices have different lens power gradients as is known in the art.

| Lens Power in the Horizontal Meridian | Base Curve |
|---|---|
| <−7.00 | 0.50D |
| <−5.00 | 1.00D |
| <−2.75 | 2.00D |
| <−1.25 | 3.00D |
| <+2.00 | 4.00D |
| <+3.25 | 5.00D |
| <+4.75 | 6.00D |
| <+6.00 | 7.00D |
| <+7.00 | 8.00D |
| <+8.25 | 9.00D |
| <+9.25 | 10.00D |
| <+10.25 | 11.00D |
| <+12.75 | 13.00D |

An iteration using base curvatures as chosen from the above schedule may then be computed. The output of this calculation is the linearity in lateral gaze of the rate of change of lateral vergence demand.

According to an embodiment, the eyes may be required to take up fixation at an arbitrary value of about 30 degrees to about 35 degrees lateral gaze left and right. The rate of change to lateral vergence may be calculated at this position and is electronically stored via the computer program on computer readable media, such as computer memory or storage, for evaluation and comparison with the other base curves. It should also be noted that the about 30 degrees to about 35 degrees is not a fixed number, but is one that a wearer may be expected to move his eyes before turning the head. Other values may be used in place of 30 degrees and 35 degrees according to further embodiments.

The base curvatures may then be increased in both lenses according to the next steepest (shorter radius) curve and the calculation may be repeated.

According to an embodiment, the final base curve selection may be made such that the longest radius curve may be selected such that they are equal, and the rate of change is less than approximately (+/−0.02) 0.2 cm/m/degree/degree at an effective lateral rotation to an object of regard of approximately 30 degrees (+/−5 degrees) lateral to the primary visual axis. If there is a substantial difference between the rate of change of the right and the left positions of gaze then it may be ascertained that there is a lateral anisometropia.

Figure 6:
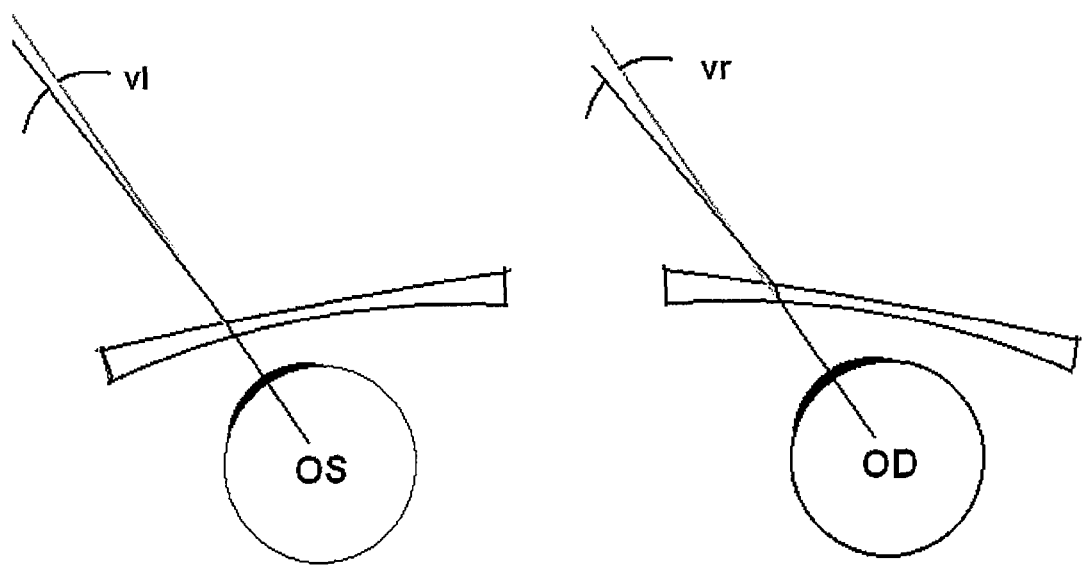
FIG. 6 is a diagram depicting the vergence demand in lateral gaze of a distant object (at infinity)

According to an embodiment, equal base curves may be initially selected for both eyes with the flattest available base curve such that the back surface remains concave in all refractive axes. FIG. 6 is a diagram depicting the vergence demand in lateral gaze of a distant object (at infinity). FIG. 6 shows the eyes taking up fixation in left lateral gaze. The angles vl and vr are the errors in fixation and the difference is the deviation from the parallel state. Ray tracing may be calculated with optical paths starting from the centre of rotation of the eye to the object of regard at infinity (parallel).

According to an embodiment, as shown in FIG. 6, the stimulus to lateral vergence may be calculated in discrete intervals between left about 30 degrees to about 35 degrees and right about 30 degrees to about 35 degrees lateral gaze with ray tracing and at the position of wear and minimum lens thickness. This may be repeated from the minimum possible base curve (maximum possible radius) that maintains a concave rear surface up to the maximum available base curve (minimum radius) in available discrete steps that may afford enough edge thickness to provide refractive correction in the periphery of the lens. The results of these calculations are graphed in FIG. 7 and may be recorded in an electronic table within the computer program in prism dioptres of vergence stimulus per degree of rotation for each interval.

According to an embodiment, minimum thickness in the case of a convex lens is where the centre thickness is adjusted such that the minimum edge thickness is one that permits enough thickness at the thinnest part of the edge of the lens to maintain structural rigidity for the mounting method to be used in view of the edge diameter of the frame (i.e. the smallest circle in which the finished lens would fit). According to an embodiment, the minimum edge thickness is typically 1.0 to 1.8 mm.

Figure 7:
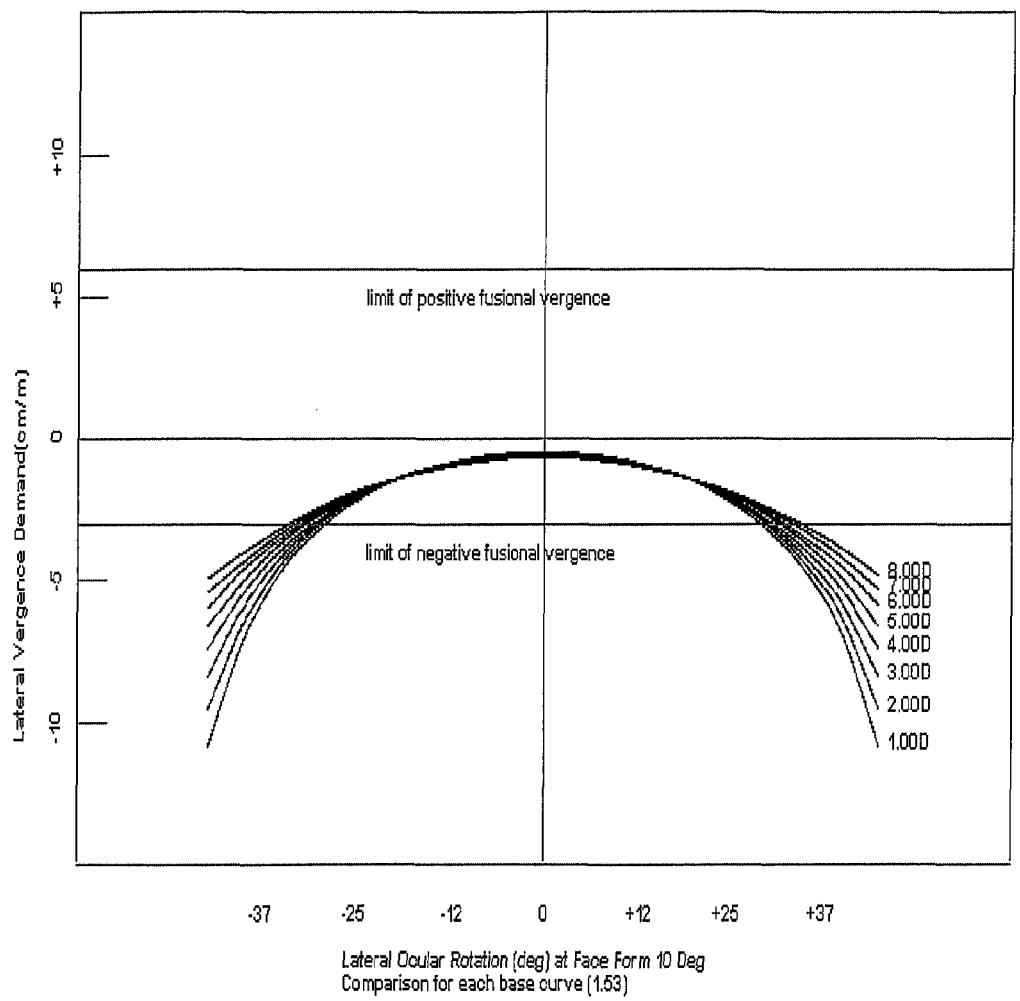
FIG. 7 is a graph depicting the relationship between vergence demand and ocular rotation at OD −5.00, OS −5.00 and 10 degrees face form.

FIG. 7 is a graph depicting the relationship between vergence demand and ocular rotation at OD −5.00, OS −5.00 and 10 degrees face form. The magnitude of angle vr-vl from FIG. 6 may be graphed with respect to the eccentricity of gaze. The relationship between eccentricity of gaze in the lateral plane and binocular vergence demand may be examined for each available front curve radii for each available index of refraction.

Figure 8:
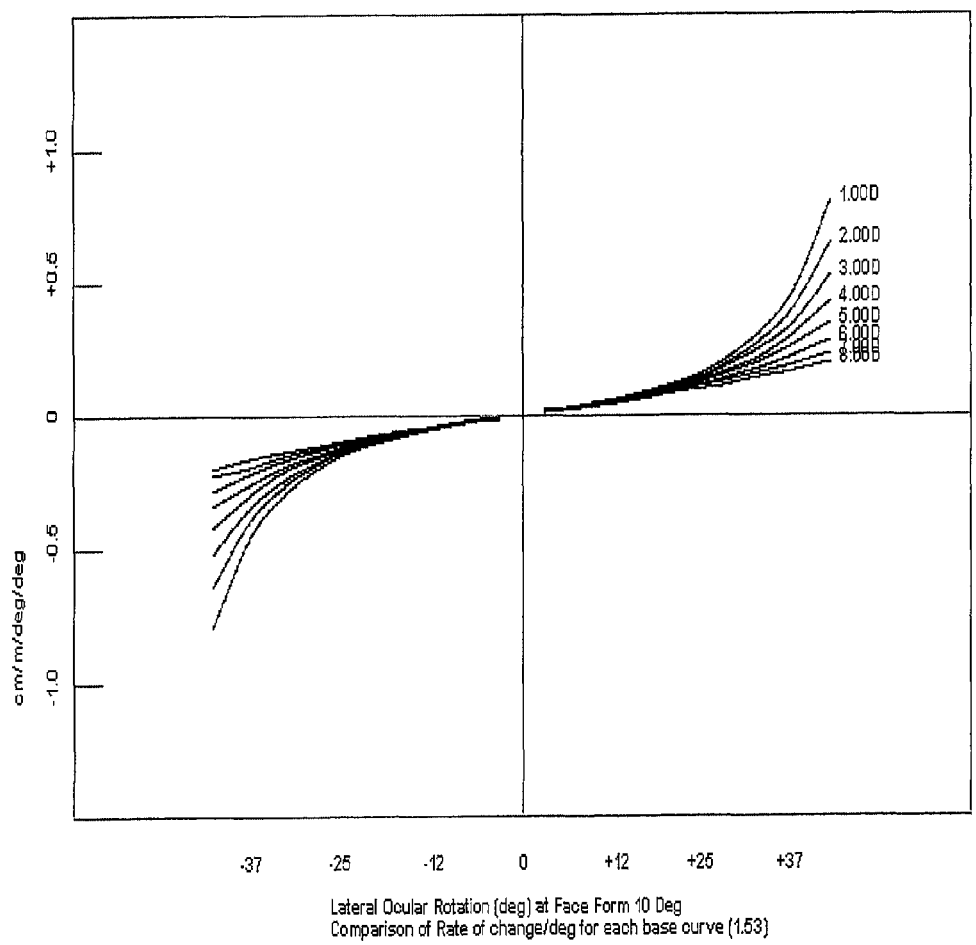
FIG. 8 is a graph depicting the rate of change of lateral vergence versus degree of ocular rotation at OD −5.00, OS −5.00 and 10 degrees face form.

The rate of change between these discrete intervals may be further tabulated and graphed as shown in FIG. 8 and the linearity may be analysed. Values for the rate of change may be obtained for various indices of refraction, front base curvatures at the "as worn" position. In FIG. 8, the graph illustrates that there exists a near linear relationship with some base curve selections and a varying relationship with others. The front base curvatures may be selected by the computer program based upon the maximum front curve radius that corresponds to the curve that resembles a substantially or near linear relationship between the rate of change versus degree of rotation. The centre thickness values may be calculated by using computational geometric construction in the case of convex lenses and by tabular form according to material using generally accepted minimum thickness (for example, 1.495: 2.0 mm, 1.604:1.4 mm) in the case of concave lenses.

In the event that such near-linearity of the rate of change per degree is not achievable the operator may be advised via the user interface that a different frame geometry should be selected. A different frame geometry may be selected through inputting new frame metrics in step 150 as discussed above.

Refractive corrections in the form of spectacles with differing focal powers may create both retinal image size disparities (static magnification) and rotational disparities (dynamic magnification). Static magnification disparities may be an impediment to effective depth perception and rotational disparities may create discomfort through vergence demands outside the physiological adaptability of the spectacle wearer. The interocular magnification for both static and dynamic magnification may be modified.

According to an embodiment, the curvature and thickness selected above may be adjusted according to an iterative process for determining the iseikonic design as described below. The inter-ocular magnification in both vertical and horizontal meridians may be calculated using the classical magnification equation, i.e. magnification=$(1/(1-t(n)(F1))\times 1/(1-dV(Fv))$, where n=index of refraction, t=the centre thickness in metres, F1=the base curve in dioptres, dV=the vertex distance, and Fv=the back vertex power. The vertical prismatic effect and consequent stimulus to vertical motor fusion in the reading zone may be determined using a ray tracing construction and constant radius surfaces or from lens calculation manufacturing software (with equal add powers the differences will be minor). According to an embodiment, the computer program may store, such as in a database, electronic data relating to the available front curve radii (base curves), indices of refraction and maximum thicknesses so that accurate and plausible designs may be provided.

According to an embodiment, an iterative process is followed in which the base curves, centre thicknesses and, in the case of multifocal lenses, corridor lengths, may be adjusted in small increments (for example, 0.50 D and 0.2 mm and 1.0 mm respectively) until the following conditions are met:

The stimulus to near vergence is within the vertical vergence limits as measured for that wearer by the eye care professional. Vertical vergence is the value of induced prismatic effect that becomes an issue with down gaze for viewing a near stimulus through the near vision zone in a multifocal lens.

The lateral inter-ocular static magnification target value is not less than about −3% or greater than about 3% in the lateral plane, and preferably, not less than about −2% or greater than about 2% in the lateral plane. In some cases, a +/−1% inter-ocular static magnification target value may be necessary, such as in the case of infantile refractive amplyopia due to anisometropia, where the target inter-ocular magnification would be close to 0% with a maximum tolerance of +/−1%. This may be in order to promote sensory fusion in the visual cortex of the brain to promote binocularity and resolve the amblyopic condition.

If multifocal lenses have been selected, the corridor length (start of full add power) value may require no less than a 20 degree downward rotation of the eyes from the primary position of gaze for a wearer to look through the lowermost zone of the lens. This concept may also assist in the placement of the upper demarcation line for bifocal and trifocal lenses. According to an embodiment, the computer program may also calculate the required adjustment in the height of a bifocal or trifocal lens through the use of a ray tracing calculation using constant radius curvatures in order to account for the effect upon the observed position of the line by the wearer due to the influence of the position of wear of the lens, the centre thickness and the base curvature.

According to an embodiment, the starting value for the corridor length may be 15 mm from the optical centre or 19 mm from the major reference point. However, this starting value may be modified as lens design needs change, for example, in the case for active and sports design eyewear.

According to an embodiment, in cases where the eye care practitioner has determined the endpoint by eikonometry then that value may supersede all previous target values. According to an embodiment, the endpoint or target value when eikonometry is not available may be one third of the inter-ocular magnification with a standard design or 2% whichever is less in absolute terms. According to an embodiment, in the case of paediatric design for amblyopia due to anisometropia then the target value may not exceed 1% in absolute terms.

According to an embodiment, in a case where it is not possible to satisfy the target values, the eye care professional may be advised, via the computer program, to change the frame size accordingly to permit a thinner centre, a modified fitting position or bevel location, or a bicentric design in addition to the adjusted base curvature and centre thickness. According to an embodiment, the amount of the prism induced at the point of view through the lens may also be calculated for each eye by ray tracing and the difference between the two is calculated by subtraction in the computer program. The primary concern may be the degree of prism in the vertical meridian in the portion of the lens, in the case of a multifocal, where the addition power permits reading at a near point. The discrepancy of the required rotation when the eyes are rotated down is the degree of rotation vergence demand which may be expressed in prism dioptres. According to an embodiment, the computer program may be configured to advise of design changes where the amount of prism is unacceptable. This threshold for the amount of prism may be a default value or a value configured by the user.

Figure 2:
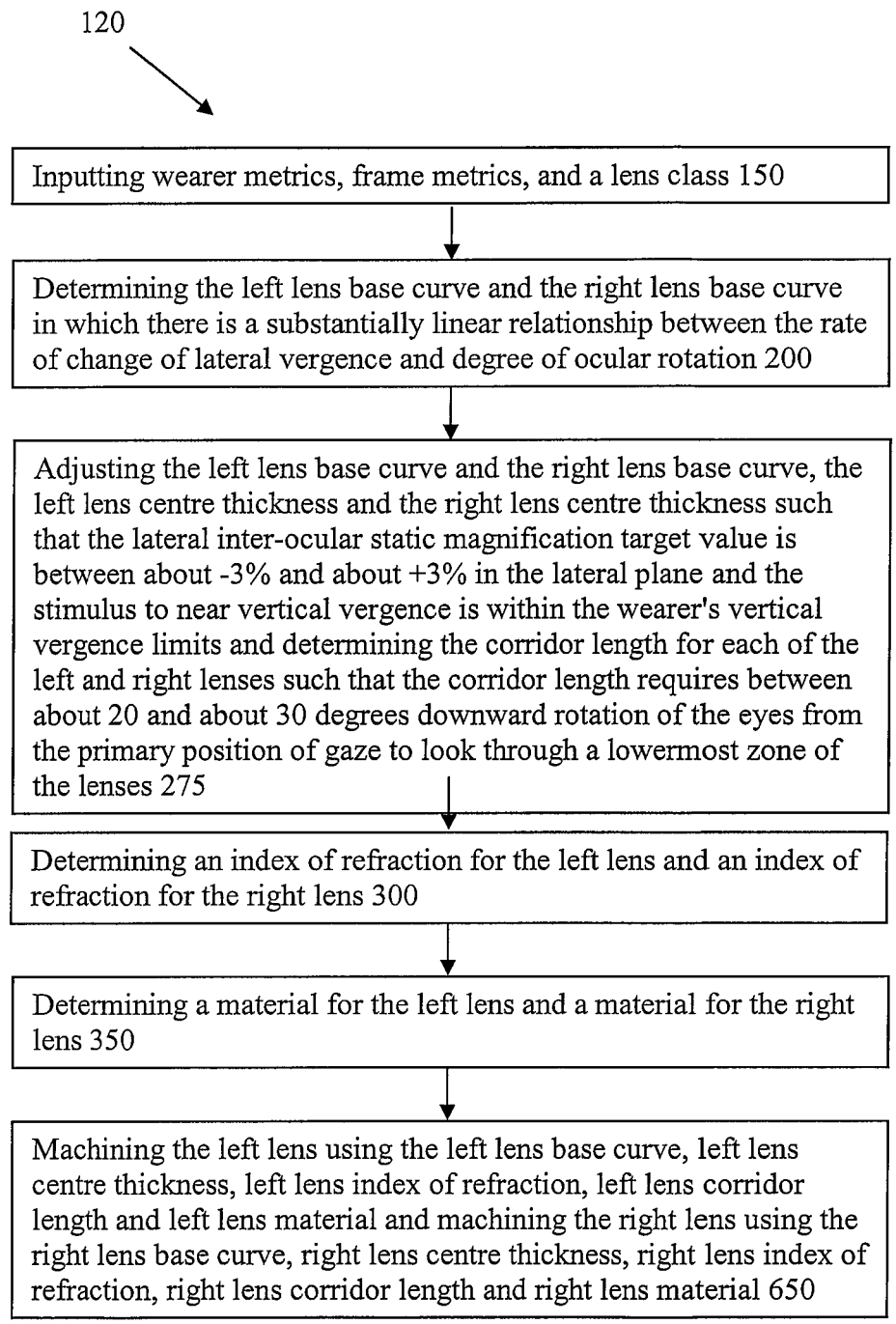
FIG. 2 is a flow chart of a further embodiment of a method according to the present invention applicable to multifocal lenses.

According to an embodiment of the invention, at step 275 as shown in the method 120 as shown in FIG. 2, corridor length optimization may be performed in the case of multifocal lenses. Traditionally, the length between the major reference point and the beginning of the full add power has been specified as a linear measurement relative to the distance from the major reference point to the bottom of the frame in millimetres. The traditional method uses the linear distance between the bottom eye-wire to the major reference point to provide the longest corridor that will fit. According to an embodiment of the present invention, the user may specify a downward rotation in degrees and the translated tangent dimension may be calculated using the angle from the downward rotation at the as worn location of the spectacle plane. The corridor length may be calculated by geometric construction in the computer program using ray tracing with the reference point at the centre of rotation of the eye. The corridor length may computed from the tangent and may be about the same value. The three points of the triangle may be the centre of rotation of the eye, the distance to the refracting surface of the lens at the optical centre and the beginning of the reading corridor.

According to an embodiment, through using the geometrical representation obtained from the biometric values and frame juxtaposition of the as worn appliance, the distance from the major reference point to the beginning of the lowermost zone (typically, the near zone) may be optimized given the downward rotation of the eyes by calculating the corridor length according to ergonomic requirements such that the corridor length accords a downward rotation between 20 and 30 degrees according to the intended use of the spectacle appliance. It may be further modified such that prismatic effect in the vertical dimension is within the values set out by the fusional limits of the wearer. This may be modified by the magnification in the vertical meridian by reducing the length in order to reduce the induced prismatic effect. Ray tracing takes into account the dynamic magnification of the ocular rotation and with anisometric corrections the target rotation may be modified in order to keep the vergence at the lowermost zone within the limit of binocular motor fusion.

At step 300, the index of refraction for each lens in a spectacle lens pair may be determined. Typical indexes of refraction for lenses are 1.50, 1.53, 1.56, 1.59, 1.60, 1.67, 1.70, 1.74, however other indexes of refraction are possible. In this step, the maximum edge thickness and base curve may be recorded for the standard or iseikonic correction. Both edge thickness and base curve for each index of refraction for a given lens pair may be compared with the mounting limits arising from the desired frame type and lens material. For example, each case may fall within the maximum edge thickness limits in the following table:

| Frame Type/Lens Material | Maximum Edge Thickness |
| --- | --- |
| Rimless | Width of eye portion of frame/12 |
| Metal Full Wire with Standard (2 mm) V bevel | Width of eye portion of frame/10 |
| Plastic, Zyl standard (4 mm) | Width of eye portion of frame/8 |
| Plastic, Zyl heavy (6 mm) | Width of eye portion of frame/6 |

The magnification of a lens may be increased with an increase in the base curvature and or an increase in the index of refraction and or the thickness. In addition to the thickness limits in the table above, the base curvature changes may be kept sufficiently flat so that the lenses fit within the frame well. According to an embodiment, for a lens pair which addresses aniseikonia by increasing base curvature, the index of refraction may be increased until the base curvature is within a range less than 2 dioptres greater than the optimum frame base curvature. For example, for a frame with base 4 dioptres (where the index of refraction is 1.53) the range for the index of refraction would be bounded such that the base curvature is 6 dioptres or less.

According to an embodiment, the user may override and define any of the index of refraction for each lens, the endpoint inter-ocular spectacle magnification or the corridor length for each lens.

According to an embodiment, in step 350, a material for the left lens and a material for the right lens are determined. The lens material may be determined based on the structural strength of the material and the intended mounting method (drill mount, grooved, etc.), edge thickness and weight. According to an embodiment, there may be certain industry and safety guidelines to ensure durability and impact resistance that need to be adhered to.

According to an embodiment, the options for lens material may be CR39 (1.495 index), MR7 (1.60 index), MR8 (1.67 index), Polycarbonate (1.59), and Trivex (1.53) 1.74. New lens materials may be added to the computer program as they become available. The physical properties of the material may affect the weight and thickness. Geometric calculation may determine the volume of the finished cut lens in order to establish the weight and the edge thickness at various points along the edge taking into account the frame dimensions. According to an embodiment, if the frame mounting requires grooving or drilling in order to attach the lens within the frame then CR39 would be deleted from the selection.

The computer program may make a recommendation for lens material based on an iterative process which the user may override. The iterative process compares the edge thickness of the various materials and selects the one that may be suitable for mounting, has a base curvature that may be the closest match for the frame and has an edge thickness that may satisfy the maximum recommended thickness requirement for the chosen frame.

Figure 3:
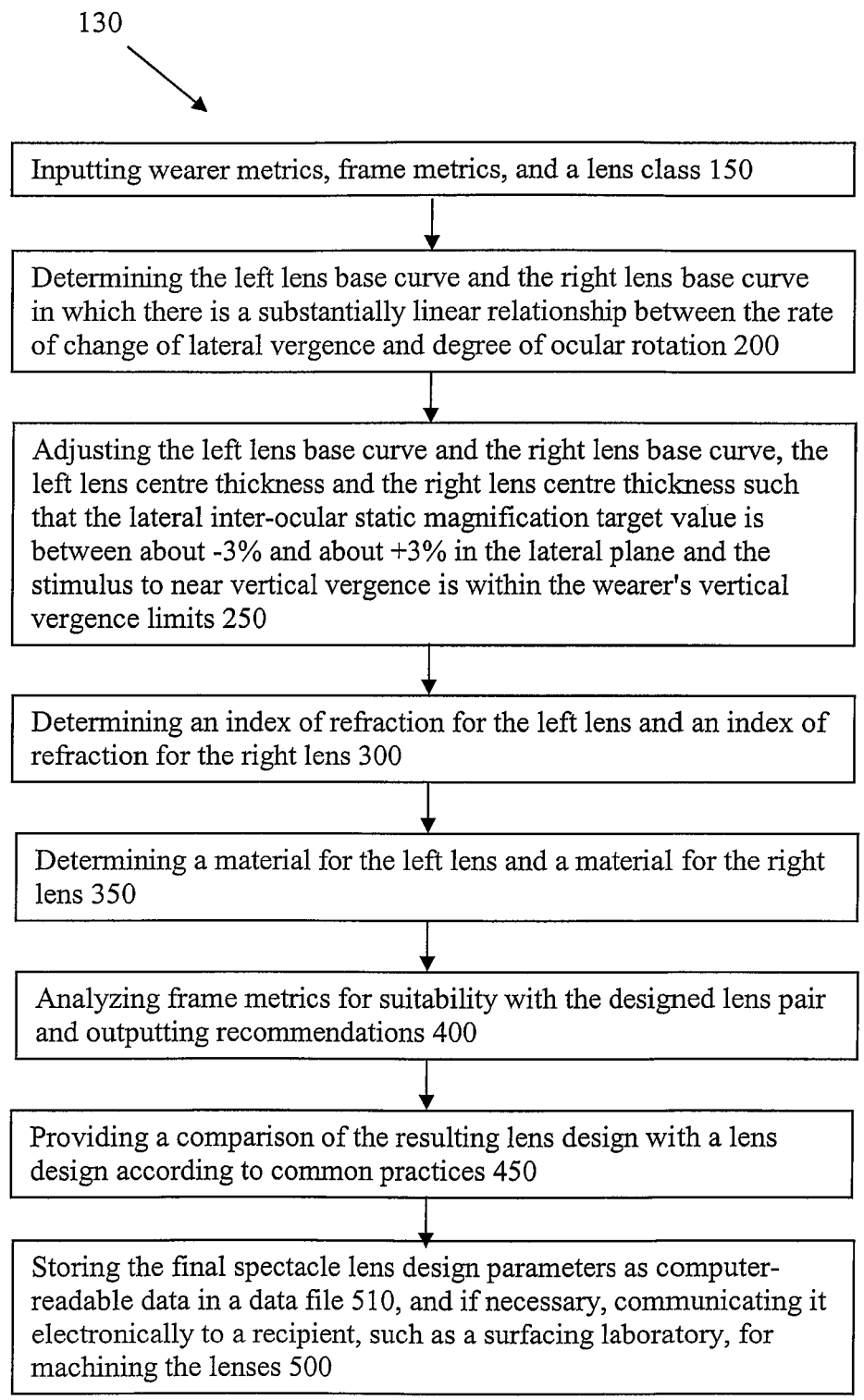
FIG. 3 is a flow chart of a further embodiment of a method according to the present invention.

According to an embodiment, in step 400, as set out in method 130 as shown in FIG. 3, the frame metrics inputted in step 150 may be analysed for suitability in terms of size, vertical versus horizontal proportion and material (in the case of a convex lens this may be done without prescribed prism), with the designed lens pair. Recommendations may be output to the dispenser as described below which may reduce dispensing problems.

The edge thickness and consequent appearance with convex (plus powered corrections) may be adversely affected by large variance of the frame's pupil distance (PD) from the wearer's pupil distance as unattractive nasal edge thickness may result. According to an embodiment, if the nasal edge thickness is greater than the nasal edge thickness of the same lens by 2 mm (or another value, as may specified by the practitioner in the computer program setup) or more then decreasing the horizontal dimension of the eye portion may be recommended.

Convex lenses when edged into spectacle frames with a small vertical dimension of the eye portion of the frame relative to the horizontal dimension may produce an edge thickness that is unacceptably thick. According to an embodiment, the user may be alerted if the superior edge is 1.5 mm (or another value, as may be specified by the practitioner in the computer program setup) or greater than the nasal (or thicker) edge. Further, a frame with a greater vertical dimension of the eye portion of the frame measurement or a frame with a larger vertical to horizontal ratio for the eye portion of the frame may be recommended.

According to an embodiment, the following guidelines may provide a cosmetically acceptable pair of spectacles for both concave and convex corrections. The guideline is that the acceptable edge thickness should be proportionate to the chosen frame size with consideration to the masking due to the eye-wire width (i.e. the eye-wire hides the edge of the lens.) To provide a cosmetically appealing finished product the frame choices listed in the table below may be recommended according to the finished lens edge thickness. The equation used in the calculation for a frame with an eye-wire is: Limit=width of the eye portion of the frame/(12−eye-wire width). The eye-wire width may be measured as the width of the frame. A metal wire frame is typically about 2 mm and a plastic frame is typically from 4 mm to 6 mm.

| Frame Type/Lens Material | Maximum Edge Thickness |
| --- | --- |
| Rimless | Width of eye portion of frame/12 |
| Metal Full Wire with Standard (2 mm) | Width of eye portion of frame/10 |
| V bevel Plastic, Zyl standard (4 mm) | Width of eye portion of frame/8 |
| Plastic, Zyl heavy (6 mm) | Width of eye portion of frame/6 |

Figure 9:
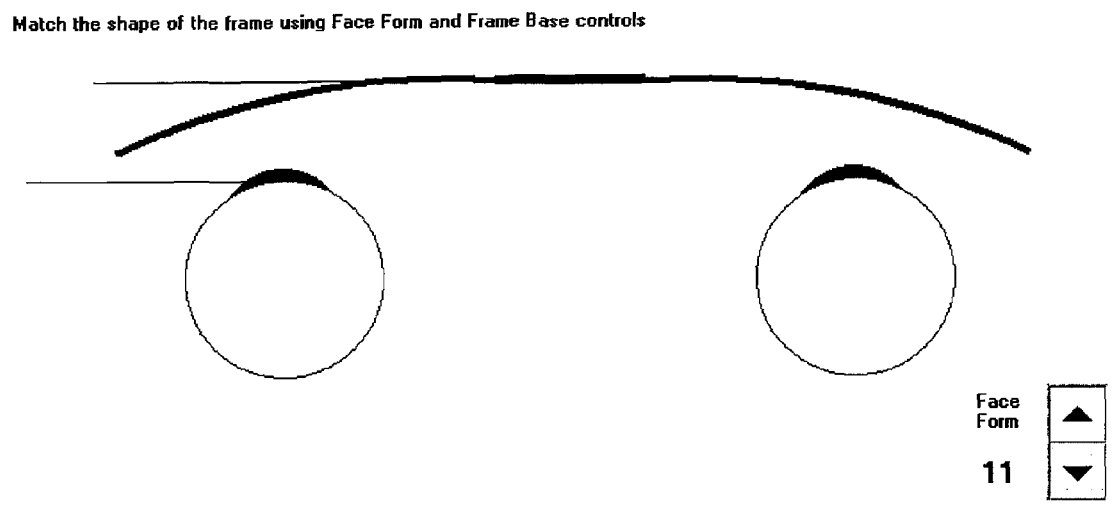
FIG. 9 is a diagram depicting the user interface of the computer program for matching the shape of the frame according to an embodiment of the invention.

FIG. 9 is a diagram depicting the user interface of the computer program for matching the shape of the frame according to an embodiment of the invention. According to an embodiment, the user interface may include a display such that a template may be created to determine the face form angle of the frame. Controls may be used to adjust the size and angle between the eye components of the frame. The template is calibrated such that it is life size and the user may place the frame on the screen and adjust the template to match it, thus determining the shape of the frame.

According to an embodiment, the position of wear of the frame may be determined by the computer program using geometric construction to locate the frame chassis in which the lenses are held with respect to the centre of rotation of the eye based on the position of the bridge portion of the frame with respect to the corneal limbus and the measure of the face form angle of the frame.

According to an embodiment, optional step 450, as set out in method 130 as shown in FIG. 3, may comprise providing a comparison between the design of the lenses made according to embodiments of the present invention with lenses made according to common practices. The design according to common practices may use the wearer refractive metrics and lens class inputted in step 150 and conventional parameters and practices to establish the baseline. The purpose of this optional step is to educate the professional and the consumer of the physiological benefits of the lenses made according to the present invention and provide supporting assistance in the explanation of the potential increased thickness of the lenses made according to embodiments of the present invention. The comparison may be both numeric and graphical. The comparison may include a comparison and explanation of: induced vertical prismatic effect in the near reading zone, the area of the visual field where the spectacle system provides single binocular vision (within the wearer's, established, fusional vergence limits), the rate of change of motor fusion demand in the lateral meridian, the inter-ocular magnification difference, and chromatic aberration in the reading zone.

According to an embodiment, in step 500, as set out in method 130 as shown in FIG. 3, the final spectacle lens design parameters may be stored as computer-readable data in a data file 510, database or other data structure on computer storage media for, if necessary, subsequent electronic transmission to a recipient, such as a surfacing laboratory. According to an embodiment, the data may be encrypted by a suitable encryption method prior to storage or transmission to maintain the confidentiality of the data. The data may be transmitted to the surfacing laboratory through computer networks, such as in a file attached to an email or via direct file-transfer-protocol (FTP) upload, or any other known means for communicating data from a sender to a recipient. The file may be decrypted, if necessary, by the recipient in a manner corresponding to the encryption scheme used.

According to embodiment, the computer-readable data may comprise the following data fields: order reference number, shipping details, customer reference, date; Right lens: sphere, cylinder, axis, refraction vertex distance, addition, prism vertical, prism horizontal, interpupillary distance, near inset, major reference point height, optical centre height, base curve, centre thickness, index of refraction; Left lens: sphere, cylinder, axis, refraction vertex distance, addition, prism vertical, prism horizontal, interpupillary distance, near inset, major reference point height, optical centre height, base curve, centre thickness, index of refraction; tint colour, density, surface treatment; horizontal dimension of the eye portion of the frame; vertical dimension of the eye portion of the frame; edge diameter, frame distance between lenses, face form angle, bridge vertex, pantoscopic angle, lens mounting type, frame material; target horizontal inter-ocular magnification, target vertical inter-ocular magnification, target vertical prismatic effect. Other data specifications may be used as long as they are suitable for enabling the machining of the lenses.

According to an embodiment, at step 600 as shown in FIG. 1, the lenses are machined at a surfacing laboratory or other location suitable for machining lenses according to the lens parameters provided. According to a further embodiment, at step 650 as shown in FIG. 2, the lenses are machined at a surfacing laboratory or other location suitable for machining lenses according to the lens parameters provided including corridor lengths for each lens. According to an embodiment of the invention, in the case that the specified base curves are unavailable the designated laboratory may be authorized to change the base curves and thicknesses to obtain target magnification values with the same technology discussed above.

Embodiments of the invention, or aspects thereof, may be provided in a computer program comprising computer readable instructions for execution on a computer. The computer program is storable on any suitable computer storage medium so as to comprise a computer program product. Such a computer program may provide a design interface which may allow the eye care practitioner to design and override lens parameters as desired. According to an embodiment, the computer program may also provide guidance by an automated endpoint design goal based upon the practitioner input of the physiological metrics of the wearer's vision system. According to an embodiment, the computer program may incorporate or access a database of available front curve radii, indices of refraction and maximum thickness so the program may provide accurate and plausible designs. According to an embodiment, the computer program may also model the position of wear of the lens system in front of the eyes and adjust the parameters for enhanced accuracy in a virtual simulation. According to an embodiment, the computer program may automatically specify the most appropriate parameters of individual front curve radii, centre thickness, index of refraction and, in the case of multifocal lenses, the length of the corridor. According to an embodiment, the specifications may be selected to account for cosmetic appearance, clinical effectiveness and ease of manufacture. According to an embodiment, the computer program may be designed to interoperable with digital back surface manufacturing systems.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of making a pair of spectacle lenses, the pair of spectacle lenses including a left lens and a right lens, each of the left and right lenses including a front curve radius, a centre thickness, an index of refraction and a material, comprising:
   inputting wearer metrics, frame metrics and a lens class;
   determining the left lens front curve radius and the right lens front curve radius in which there is a substantially linear relationship between the rate of change of lateral vergence and degree of ocular rotation;
   adjusting the left lens front curve radius and the right lens front curve radius, the left lens centre thickness and the right lens centre thickness such that the lateral inter-ocular static magnification target value is between about −3% and about +3% in a lateral plane and the stimulus to near vergence is within the wearer's vergence limits, wherein the lateral inter-ocular static magnification target value is the difference between the static magnification of the left lens in a lateral (horizontal) plane of the wearer's eyes expressed as a percentage amount and the static magnification of the right lens in a lateral (horizontal) plane of the wearer's eyes expressed as a percentage amount;
   determining a left lens index of refraction and a right lens index of refraction;
   determining a left lens material and a right lens material;
   machining the left lens using the left lens front curve radius, left lens centre thickness, left lens index of refraction and left lens material and machining the right lens using the right lens front curve radius, right lens centre thickness, right lens index of refraction and right lens material.

2. The method of claim 1, further comprising determining geometric distances between a major reference point and the optical centre for the left lens and the right lens.

3. The method of claim 2, wherein machining the left lens further comprises using the geometric distance between the major reference point and the optical centre for the left lens and machining the right lens further comprises using the geometric distance between the major reference point and the optical centre for the right lens.

4. The method of claim 1, wherein selecting the lens class comprises selecting multifocal lenses.

5. The method of claim 1, wherein the pair of spectacle lenses are progressive addition spectacle lenses with each of the left and right lenses comprising a corridor and the step of adjusting further comprises determining the corridor length for each of the left and right lenses such that the corridor length requires between about a 20 degree to about a 30 degree downward rotation of the eyes from the primary position of gaze for a wearer to look through a lowermost zone of the lenses.

6. The method of claim 5, wherein machining the left lens further comprises using the corridor length for the left lens and machining the right lens further comprises using the corridor length for the right lens.

7. The method of claim 1, wherein inputting wearer metrics and frame metrics comprises inputting wearer refractive metrics, ophthalmic frame metrics and position of wear metrics.

8. The method of claim 7, wherein inputting wearer metrics further comprises inputting wearer binocular vision metrics.

9. The method of claim 1, wherein the lateral inter-ocular static magnification target value is between about −2% and about +2% in the lateral plane.

10. A pair of spectacle lenses made according to the method of claim 1.

11. A pair of spectacle lenses made according to the method of claim 3.

12. A pair of spectacle lenses made according to the method of claim 6.

13. A pair of spectacle lenses made according to the method of claim 9.

14. A computer program product for designing a pair of spectacle lenses, the pair of spectacle lenses including a left lens and a right lens, each of the left and right lenses including lens parameters including a front curve radius, a centre thickness, an index of refraction and a material, and generating one or more data files containing the lens parameters for use in machining the pair of spectacle lenses, the computer program product comprising:
   a tangible storage medium storing computer readable instructions;
   the computer readable instructions including instructions for:
   receiving wearer metrics, frame metrics and a selection of a lens class;
   determining the left lens front curve radius and the right lens front curve radius in which there is a substantially linear relationship between the rate of change of lateral vergence and degree of ocular rotation;
   adjusting the left lens front curve radius and the right lens front curve radius, the left lens centre thickness and the right lens centre thickness such that the lateral inter-ocular static magnification target value is between about −3% and about +3% in a lateral plane and the stimulus to near vergence is within the wearer's vergence limits, wherein the lateral inter-ocular static magnification target value is the difference between the static magnification of the left lens in a lateral (horizontal) plane of the wearer's eyes expressed as a percentage amount and the static magnification of the right lens in a lateral (horizontal) plane of the wearer's eyes expressed as a percentage amount;
   determining a left lens index of refraction and a right lens index of refraction;
   determining a left lens material and a right lens material; and
   generating the one or more data files containing the lens parameters for use in machining the pair of spectacle lenses.

15. The computer program product of claim 14, further comprising instructions for transmitting the one or more data files over a computer network to a recipient.

16. The computer program product of claim 14, further comprising instructions for encrypting and storing the one or more data files.

17. The computer program product of claim 14, further comprising instructions for determining geometric distances between a major reference point and an optical centre for the left lens and the right lens.

18. The computer program product of claim 14, wherein the pair of spectacle lenses are progressive addition spectacle lenses with each of the left and right lenses comprising a corridor and the instructions for adjusting further comprises determining the corridor length for each of the left and right lenses such that the corridor length requires about a 20 degree to about a 30 degree downward rotation of the eyes from the primary position of gaze for a wearer to look through a lowermost zone of the lenses where the selected lens class is a multifocal lens class.

19. The computer program product of claim 14, wherein receiving wearer metrics includes receiving wearer binocular vision metrics.

20. The computer program product of claim 14, wherein the lateral inter-ocular static magnification target value is between about −2% and about +2% in the lateral plane.

21. A system for designing a pair of spectacle lenses, the pair of spectacle lenses including a left lens and a right lens, each of the left and right lenses including lens parameters including a front curve radius, a centre thickness, an index of refraction and a material, the system comprising:
   a computer comprising a tangible storage medium storing computer readable instructions for:
   receiving wearer metrics, frame metrics and a selection of a lens class;
   determining the left lens front curve radius and the right lens front curve radius in which there is a substantially linear relationship between the rate of change of lateral vergence and degree of ocular rotation;
   adjusting the left lens front curve radius and the right lens front curve radius, the left lens centre thickness and the right lens centre thickness such that the lateral inter-ocular static magnification target value is between about −3% and about +3% in a lateral plane and the stimulus to near vergence is within the wearer's vergence limits, wherein the lateral inter-ocular static magnification target value is the difference between the static magnification of the left lens in a lateral (horizontal) plane of the wearer's eyes expressed as a percentage amount and the static magnification of the right lens in a lateral (horizontal) plane of the wearer's eyes expressed as a percentage amount;
   determining a left lens index of refraction and a right lens index of refraction;
   determining a left lens material and a right lens material;
   generating the one or more data files containing the lens parameters for use in machining the pair of spectacle lenses; and
   transmitting the one or more data files to a recipient; and
   a surfacing laboratory comprising one or more further computers, at least one of the further computers for receiving the one or more data files from a sender, and at least one of the further computers for machining the left lens using the left lens front curve radius, left lens centre thickness, left lens index of refraction and left lens material and machining the right lens using the right lens front curve radius, right lens centre thickness, right lens index of refraction and right lens material.

22. The system of claim 21, the computer further comprising instructions for encrypting and storing the one or more data files.

23. The system of claim 21, the computer further comprising instructions for determining geometric distances between a major reference point and an optical centre for the left lens and the right lens.

24. The system of claim 21, wherein the pair of spectacle lenses are progressive addition spectacle lenses with each of the left and right lenses comprising a corridor and the instructions for adjusting further comprises determining the corridor length for each of the left and right lenses such that the corridor length requires about a 20 degree to about a 30 degree downward rotation of the eyes from the primary position of gaze for a wearer to look through a lowermost zone of the lenses where the selected lens class is a multifocal lens class.

25. The system of claim 21, wherein receiving wearer metrics includes receiving wearer binocular vision metrics.

26. The system of claim 21, wherein the lateral inter-ocular static magnification target value is between about −2% and about +2% in the lateral plane.

* * * * *